(12) United States Patent
Teren

(10) Patent No.: US 11,672,245 B1
(45) Date of Patent: Jun. 13, 2023

(54) PEST CONTROL DEVICE FOR RESIDENTIAL TRASH CANS AND METHOD OF USE

(71) Applicant: Darren Mark Teren, Valley Center, CA (US)

(72) Inventor: Darren Mark Teren, Valley Center, CA (US)

( * ) Notice: Subject to any disclaimer, the term of this patent is extended or adjusted under 35 U.S.C. 154(b) by 0 days.

(21) Appl. No.: 17/880,365

(22) Filed: Aug. 3, 2022

(51) Int. Cl.
    *A01M 29/34* (2011.01)
    *B65F 1/14* (2006.01)
    *A01M 1/14* (2006.01)

(52) U.S. Cl.
    CPC .............. *A01M 29/34* (2013.01); *B65F 1/14* (2013.01); *A01M 1/14* (2013.01)

(58) Field of Classification Search
    CPC   A01M 1/00; A01M 1/20; A01M 1/24; A01M 29/00; A01M 29/12; A01M 29/30; A01M 29/34; B65F 1/14; B65F 1/1452; B65F 1/1468; B65F 1/00
    USPC ............. 43/1, 124, 132.1, 131, 120; 52/101; 116/22 A; 220/730; 2/10, 173, 206; 128/206.14, 206.12, 206.19, 206.21, 128/206.25
    See application file for complete search history.

(56) References Cited

U.S. PATENT DOCUMENTS

| | | | | | |
|---|---|---|---|---|---|
| 1,043,774 | A | * | 11/1912 | Kirkman .................... | 220/87.1 |
| 1,082,103 | A | * | 12/1913 | Welter ...................... | 43/118 |
| 1,085,701 | A | * | 2/1914 | Richman .................... | 43/120 |
| 1,114,191 | A | * | 10/1914 | Shapiro ..................... | 43/120 |
| 1,212,660 | A | * | 1/1917 | Meade ....................... | 43/120 |
| 1,244,859 | A | * | 10/1917 | Johnson ..................... | 43/120 |
| 1,290,760 | A | * | 1/1919 | Langbein .................... | 43/120 |
| 1,321,286 | A | * | 11/1919 | Connolly .................... | 43/120 |
| 1,324,727 | A | * | 12/1919 | Carlson ...................... | 43/115 |
| 1,350,402 | A | * | 8/1920 | Cereghino ................ | B65F 1/14 43/120 |
| 1,463,659 | A | * | 7/1923 | Paul ....................... | A01M 1/106 43/120 |
| 1,467,895 | A | * | 9/1923 | Dunseth ................ | A01M 1/106 43/120 |
| 1,505,014 | A | * | 8/1924 | Duncan ................ | A01M 1/106 43/120 |
| 1,607,249 | A | * | 11/1926 | Dyer ..................... | A01M 1/106 43/120 |
| 1,719,186 | A | * | 7/1929 | Lowy ....................... | B65F 7/00 220/87.1 |
| 1,815,122 | A | * | 7/1931 | Smith .................... | A01M 1/106 43/120 |

(Continued)

FOREIGN PATENT DOCUMENTS

| | | | | |
|---|---|---|---|---|
| KR | 20120030245 A | * | 3/2012 | |
| WO | WO-2006088382 A1 | * | 8/2006 | .............. A01M 1/10 |

*Primary Examiner* — Darren W Ark
(74) *Attorney, Agent, or Firm* — Leavitt Eldredge Law Firm

(57) ABSTRACT

A pest control device for providing a barrier against pests and insects around the handle of a residential trash can is disclosed. The device includes a generally rectangular shaped, flexible body, the body having a first set of opposing ends and a second set of opposing ends, wherein each set of opposing ends are generally perpendicular between each other; a pair of elastic bands coupled to the first set of opposing ends; a pair of peel-off adhesive tape coupled to the second set of opposing ends; and a pair of tethers, each tether connecting the first set of opposing ends.

4 Claims, 3 Drawing Sheets

(56) References Cited

U.S. PATENT DOCUMENTS

| | | | | |
|---|---|---|---|---|
| 2,636,175 A * | 4/1953 | Hoffman, Jr. | A41D 27/136 | 2/323 |
| 2,721,099 A * | 10/1955 | Rupp | A01M 1/2055 | 239/57 |
| 2,808,679 A * | 10/1957 | Collins | A01M 1/2011 | 43/131 |
| 2,921,581 A * | 1/1960 | Swearingen | A62B 18/025 | 128/206.25 |
| 3,098,703 A * | 7/1963 | Snyder | A01M 1/2055 | 514/723 |
| 3,303,599 A * | 2/1967 | Ballard | A01M 1/106 | 43/118 |
| 3,480,176 A * | 11/1969 | Boyd | A01M 29/24 | 220/730 |
| 3,661,326 A * | 5/1972 | Wilson | A01M 1/2055 | 220/87.1 |
| 3,664,335 A * | 5/1972 | Boucher | A41D 13/113 | 128/206.19 |
| 3,779,244 A * | 12/1973 | Weeks, Jr. | A41D 13/1146 | 55/DIG. 35 |
| RE28,102 E * | 8/1974 | Mayhew | A41D 13/1115 | 128/206.19 |
| 3,834,384 A * | 9/1974 | Raines | A41D 13/11 | 128/201.15 |
| 4,100,624 A * | 7/1978 | Davis | A41B 11/14 | 2/409 |
| 4,105,144 A * | 8/1978 | Lin | A01M 1/2044 | 206/532 |
| 4,202,472 A * | 5/1980 | Lin | A01M 1/2055 | 206/532 |
| 4,203,479 A * | 5/1980 | Mathews | B65F 1/00 | 383/117 |
| 4,643,182 A * | 2/1987 | Klein | B01D 39/2055 | 55/DIG. 35 |
| 4,797,956 A * | 1/1989 | Boyce | A61F 9/025 | 2/13 |
| 4,881,671 A * | 11/1989 | Horton | A45C 1/04 | 43/132.1 |
| 4,941,210 A * | 7/1990 | Konucik | A41D 27/13 | 2/195.3 |
| 4,944,294 A * | 7/1990 | Borek, Jr. | A62B 18/082 | 128/201.15 |
| 4,966,140 A * | 10/1990 | Herzberg | A42B 1/045 | 128/206.13 |
| 5,280,684 A * | 1/1994 | Filonczuk | A01M 1/223 | 43/120 |
| 5,347,657 A * | 9/1994 | Unsell | A41D 7/005 | 2/400 |
| 5,359,805 A * | 11/1994 | Kadokura | A01M 29/08 | 43/108 |
| 5,383,450 A * | 1/1995 | Hubbard | A41D 13/1184 | 2/427 |
| 5,406,944 A * | 4/1995 | Gazzara | A62B 18/082 | 128/201.12 |
| 5,446,925 A * | 9/1995 | Baker | A61F 9/02 | 2/9 |
| 5,561,863 A * | 10/1996 | Carlson, II | A41D 13/1184 | 2/206 |
| 5,656,368 A * | 8/1997 | Braun | B01D 39/1623 | 210/493.1 |
| 5,682,879 A * | 11/1997 | Bowers | A62B 18/082 | 128/201.12 |
| 5,803,075 A * | 9/1998 | Yavitz | A41D 13/1115 | 128/206.28 |
| 5,813,398 A * | 9/1998 | Baird | A41D 13/1115 | 128/206.13 |
| 5,819,466 A * | 10/1998 | Aesch | A01M 1/245 | 52/404.2 |
| 5,850,808 A * | 12/1998 | Burdick | A01M 29/26 | 119/713 |
| 5,884,426 A * | 3/1999 | Ishida | A01M 29/26 | 116/22 A |
| 5,884,801 A * | 3/1999 | Simpson | B65F 1/0006 | 220/495.08 |
| 6,026,511 A * | 2/2000 | Baumann | A61F 9/029 | 2/9 |
| 6,062,220 A * | 5/2000 | Whitaker | A62B 18/08 | 128/206.19 |
| 6,062,412 A * | 5/2000 | Jacobsmeyer, Jr. | B65F 1/16 | 220/259.5 |
| 6,185,740 B1 * | 2/2001 | Zegarelli | A61F 9/045 | 128/857 |
| 6,477,977 B1 * | 11/2002 | Combes | A01M 29/32 | 114/343 |
| 6,659,970 B1 * | 12/2003 | Woodworth | A61F 15/006 | 602/42 |
| 6,694,971 B2 * | 2/2004 | Schroeder | A62B 23/025 | 128/201.14 |
| 6,828,578 B2 * | 12/2004 | DeMeo | A41D 13/11 | 250/516.1 |
| 6,886,563 B2 * | 5/2005 | Bostock | A41D 13/1115 | 128/206.19 |
| 6,978,782 B2 * | 12/2005 | Tayebi | A62B 23/025 | 128/201.17 |
| 7,077,140 B1 * | 7/2006 | Berke | A41D 13/1176 | 128/206.28 |
| 7,530,354 B2 * | 5/2009 | Hanlon | A62B 23/06 | 128/206.14 |
| 7,549,180 B2 * | 6/2009 | Matsumoto | A61F 9/02 | 2/436 |
| 7,866,679 B1 * | 1/2011 | Leon | B65F 1/1426 | 280/79.5 |
| 8,110,061 B2 * | 2/2012 | Moore | A62B 23/06 | 128/205.27 |
| 8,261,375 B1 * | 9/2012 | Reaux | A41D 13/1184 | 128/201.15 |
| 8,490,324 B2 * | 7/2013 | Highet | B65F 1/1473 | 43/131 |
| 8,657,139 B1 * | 2/2014 | Bodine | A61L 9/12 | 220/730 |
| 8,938,812 B1 * | 1/2015 | Gandy | A41D 27/13 | 2/55 |
| 9,497,954 B1 * | 11/2016 | Veasey, III | A01M 13/003 | |
| 9,504,244 B2 * | 11/2016 | Highet | A01M 25/004 | |
| 9,770,611 B2 * | 9/2017 | Facer | A41D 13/11 | |
| 9,992,992 B1 * | 6/2018 | Edelen | A01M 29/34 | |
| 10,098,336 B2 * | 10/2018 | Darnell | A01M 1/106 | |
| 10,285,395 B1 * | 5/2019 | Ehrenberg | A01M 29/30 | |
| 10,575,514 B1 * | 3/2020 | Sasaki | G02C 7/10 | |
| 10,575,572 B2 * | 3/2020 | Kakinuma | G02B 1/18 | |
| 11,459,172 B2 * | 10/2022 | Martin, II | B65F 1/1646 | |
| 11,518,610 B2 * | 12/2022 | Miller | B65F 1/16 | |
| 11,523,601 B2 * | 12/2022 | Mateer | A01N 25/18 | |
| 2003/0136410 A1 * | 7/2003 | Matich | A62B 18/08 | 128/206.25 |
| 2003/0167550 A1 * | 9/2003 | Andrews | A41D 27/133 | 2/53 |
| 2003/0186604 A1 * | 10/2003 | Nourigat | A01M 1/04 | 428/114 |
| 2006/0101707 A1 * | 5/2006 | James | A01M 1/2055 | 43/132.1 |
| 2006/0242891 A1 * | 11/2006 | Marshall | A01M 29/34 | 43/132.1 |
| 2007/0067888 A1 * | 3/2007 | Manier | A41D 31/12 | 2/53 |
| 2007/0295334 A1 * | 12/2007 | Nonomura | D21H 21/36 | 128/206.13 |
| 2008/0163409 A1 * | 7/2008 | Humiston | A01M 1/14 | 2/410 |
| 2008/0163541 A1 * | 7/2008 | Harris | B65F 1/16 | 43/131 |
| 2009/0277451 A1 * | 11/2009 | Weinberg | A41D 13/1176 | 128/206.16 |
| 2010/0236470 A1 * | 9/2010 | Doty, III | A01M 29/06 | 116/22 A |
| 2011/0065359 A1 * | 3/2011 | Kenny | A41C 3/12 | 450/39 |

(56) References Cited

U.S. PATENT DOCUMENTS

| | | | |
|---|---|---|---|
| 2011/0155137 A1* | 6/2011 | Martin | A41D 13/1146 29/527.1 |
| 2011/0220109 A1* | 9/2011 | Chiu | A41D 13/1161 128/206.19 |
| 2012/0060258 A1* | 3/2012 | Stewart | A61P 31/04 2/206 |
| 2012/0060843 A1* | 3/2012 | Magidson | A41D 13/1146 128/206.19 |
| 2012/0291336 A1* | 11/2012 | Friend | A01M 1/20 43/131 |
| 2013/0255134 A1* | 10/2013 | Robinson | A01M 1/14 43/114 |
| 2014/0069976 A1* | 3/2014 | Osher | A01K 27/008 221/26 |
| 2014/0290122 A1* | 10/2014 | Vasu | A01M 1/103 43/58 |
| 2014/0360502 A1* | 12/2014 | Kushida | A61M 16/0694 128/206.25 |
| 2015/0150326 A1* | 6/2015 | Gains | A41G 7/00 2/206 |
| 2015/0335007 A1* | 11/2015 | Donoho | E04B 1/72 52/101 |
| 2016/0029616 A1* | 2/2016 | Johnston | A01M 29/30 43/132.1 |
| 2016/0052714 A1* | 2/2016 | McDade | B65F 1/1615 220/730 |
| 2016/0157441 A1* | 6/2016 | Esler | A01G 13/0237 43/124 |
| 2017/0127662 A1* | 5/2017 | Gajdicar | A01M 29/14 |
| 2017/0320667 A1* | 11/2017 | Stone | E05B 63/143 |
| 2019/0075782 A1* | 3/2019 | Pradines | A01M 1/245 |
| 2020/0107535 A1* | 4/2020 | Hutter | A01M 1/14 |
| 2020/0240551 A1* | 7/2020 | Escure | F16L 3/233 |
| 2020/0331696 A1* | 10/2020 | Foster | B65F 1/1615 |
| 2020/0346853 A1* | 11/2020 | Thompson-Buist | B65F 1/14 |
| 2021/0137093 A1* | 5/2021 | Gonzales | A01N 59/00 |
| 2022/0015349 A1* | 1/2022 | Toon, Jr. | A01M 29/12 |
| 2022/0104478 A1* | 4/2022 | Chang | A01M 29/34 |
| 2022/0297933 A1* | 9/2022 | Elaywan | B65F 1/1646 |

\* cited by examiner

PEST CONTROL DEVICE FOR RESIDENTIAL TRASH CANS AND METHOD OF USE

BACKGROUND

1. Field of the Invention

The present invention relates generally to residential trash cans, and more specifically to a pest control device that provides a barrier against pests and insects, especially spiders, on a handle of a residential trash can.

2. Description of Related Art

Consumers often place their garbage into residential trash cans for subsequent disposal. For example, FIG. 1 depicts a conventional residential trash can 101 having a container body 103, a lid 105, and a handle 107. Typically, the handle 107 includes a hand grip portion 109 secured to the body 103 via support members (e.g., support members 111a, 111b). During use, the user can use the handle 107 to maneuver and transport the trash can 101 as needed and desired.

One of the problems commonly associated with the trash can 101 is its proneness of attracting pests and insects. For example, after placing garbage into the container body 103, the garbage often produces an unpleasant atmosphere and thus attracts pests and insects. While the lid 105 provides a barrier to prevent pests and insects from entering the container body 103, the handle 107 is left unprotected. Pests such as spiders often form spider webs around the handle 107, posing significant safety risk.

Accordingly, it is an object of the present invention to provide a pest control device that prevents pests and insects from accessing handles of residential trash cans.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
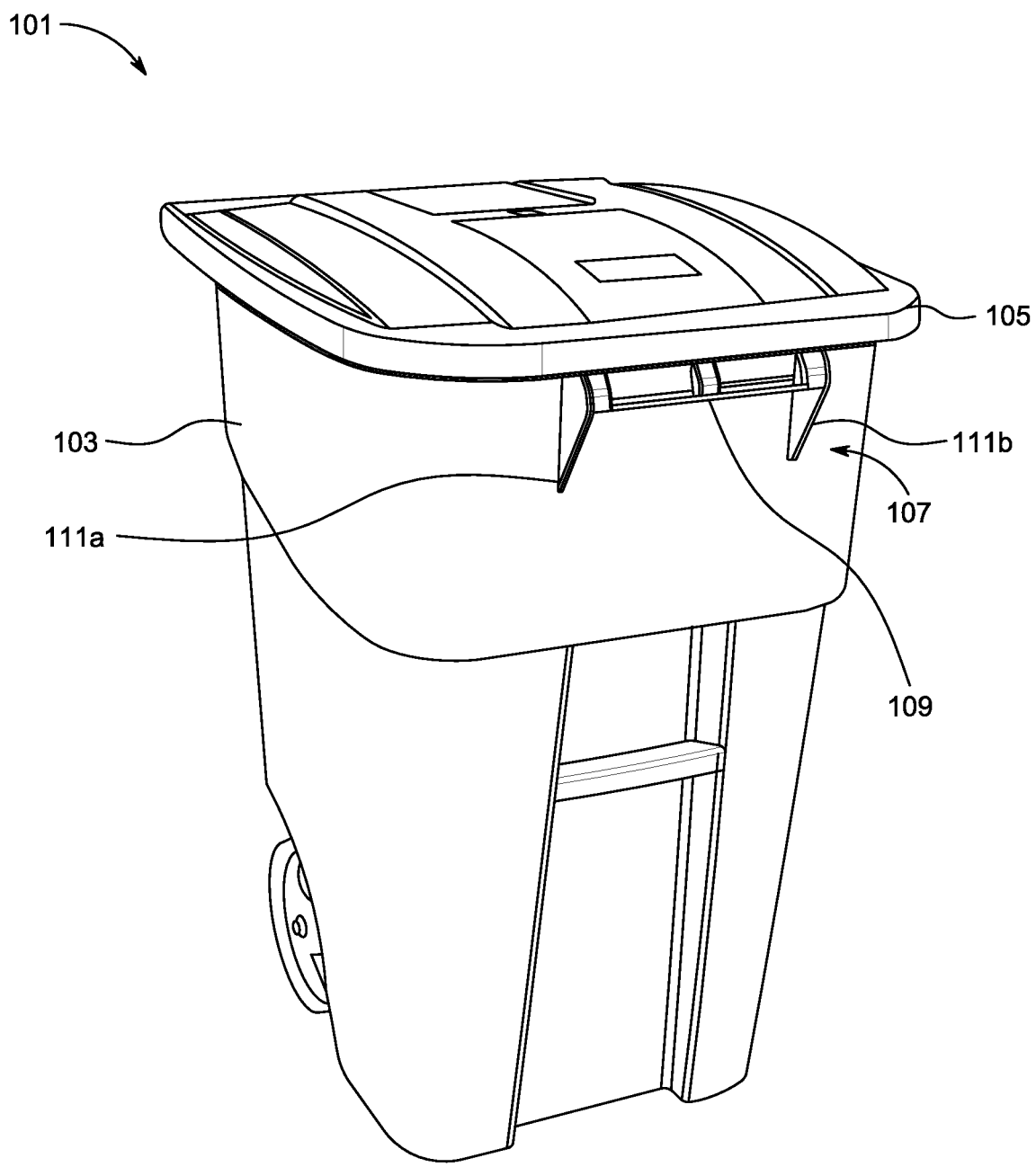
FIG. 1 is a perspective view of a common residential trash can.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional residential trash cans. Specifically, the present invention provides for a solution to prevent pests and insects from occupying the handles of residential trash cans without the use of chemicals or manual cleaning. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
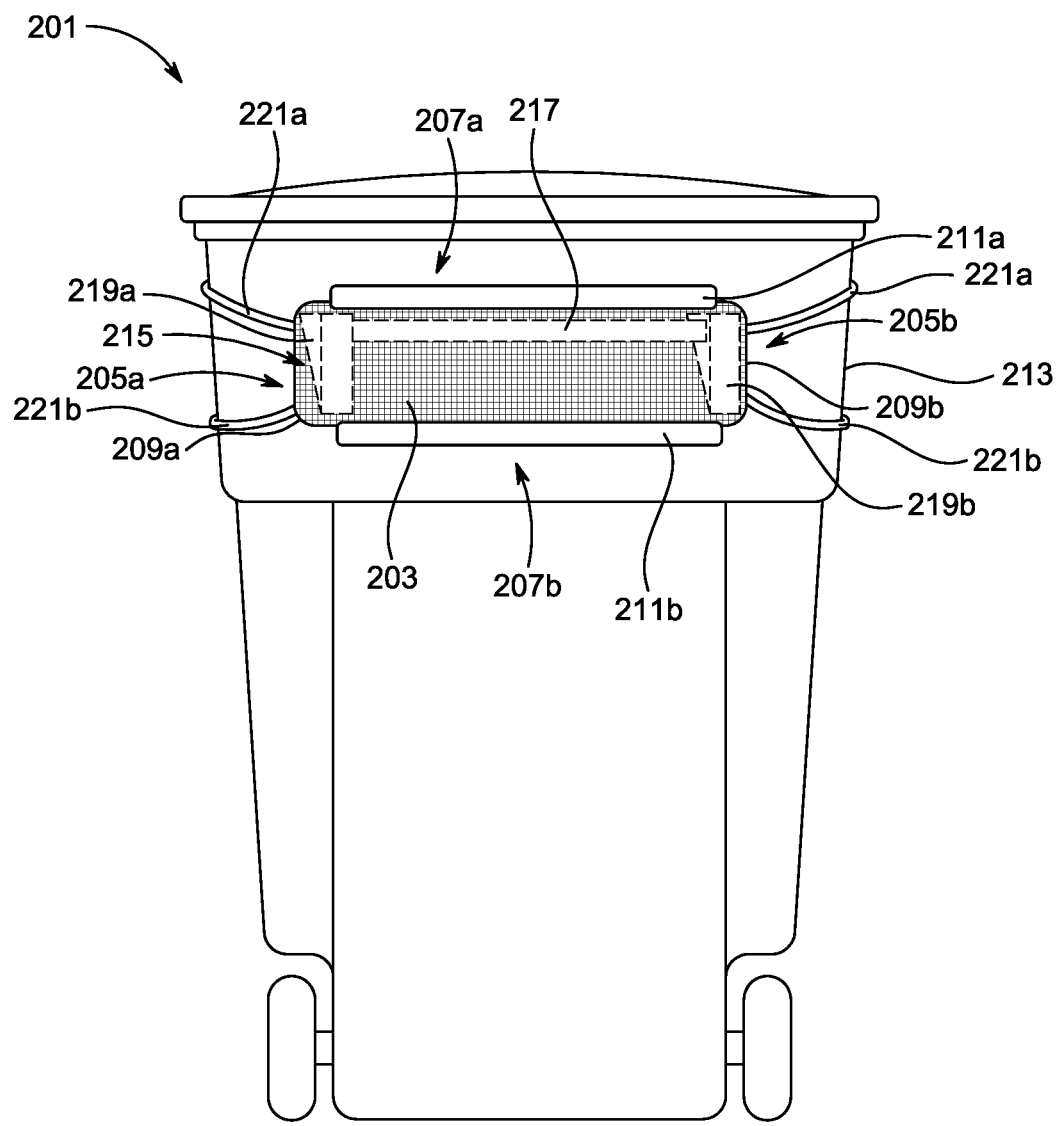
FIG. 2 is a front view of a pest control device in use on a residential trash can in accordance with one or more embodiments of the present application.

Referring now to the drawings wherein like reference characters identify corresponding or similar elements throughout the several views, FIG. 2 depicts a front view of a pest control device 201 in accordance with one or more embodiments of the present application. It will be appreciated that device 201 overcomes one or more of the above-listed problems commonly associated with conventional residential trash cans.

In the contemplated embodiment, the pest control device 201 includes a generally rectangular shaped flexible body 203 having a first set of opposing ends 205a-b as opposing ends of rectangular body 203 and the second set of opposing ends 207a-b are opposing lateral sides of rectangular body 203. In the preferred embodiment, the body 203 is constructed of micromesh netting or thin plastic film.

The pest control device 201 also includes a pair of elastic bands 209a, 209b, each of which borders opposing ends 205a, 205b, respectively. The elastic bands 209a, 209b provide for an adjustable friction fit at both ends.

The pest control device 201 further includes a pair of peel-off adhesive tape 211a, 211b, each of which borders opposing ends 207a, 207b. The adhesive tape 211a, 211b provide for a semi-permanent connection point. In the preferred embodiment, the adhesive tape 211a, 211b is waterproof.

During use, the elastic bands 209a, 209b are wrapped over the support members 219a, 219b of a handle 215 of a residential trash can 213, thereby encapsulating the entire handle 215. The adhesive tape 211a, 211b stick to the outer surface of the trash can 213 to seal off the handle 215. It should be appreciated that the adhesive tape 211a, 211b prevent environmental conditions and human interaction from jarring the pest control device 201 out of position from the handle 215. In addition, it should be appreciated that the body 203 is constructed with enough material to allow the handle grip portion 217 to be grasped by the user when maneuvering or transporting the trash can 213.

In some embodiments, the pest control device 201 also includes a pair of tethers 221a, 221b, each tether connecting opposing ends 205a, 205b. The tethers 221a, 221b are configured to wrap around the parimeter of the trash can 213. The tethers 221a, 221b can employ a fastening mechanism (e.g., buckles) or is stretchable so that the pest control device 201 is securely held against the trash can 213.

It should also be appreciated that one of the unique features believed characteristic of the present application is the configuration of features, namely the body, elastic bands, and adhesive tape, that allow for the user seal off the handle of a trash can from pests, insects, and various environmental conditions from accumulating around the handle without the use of chemical pesticides or manual cleaning.

Figure 3:
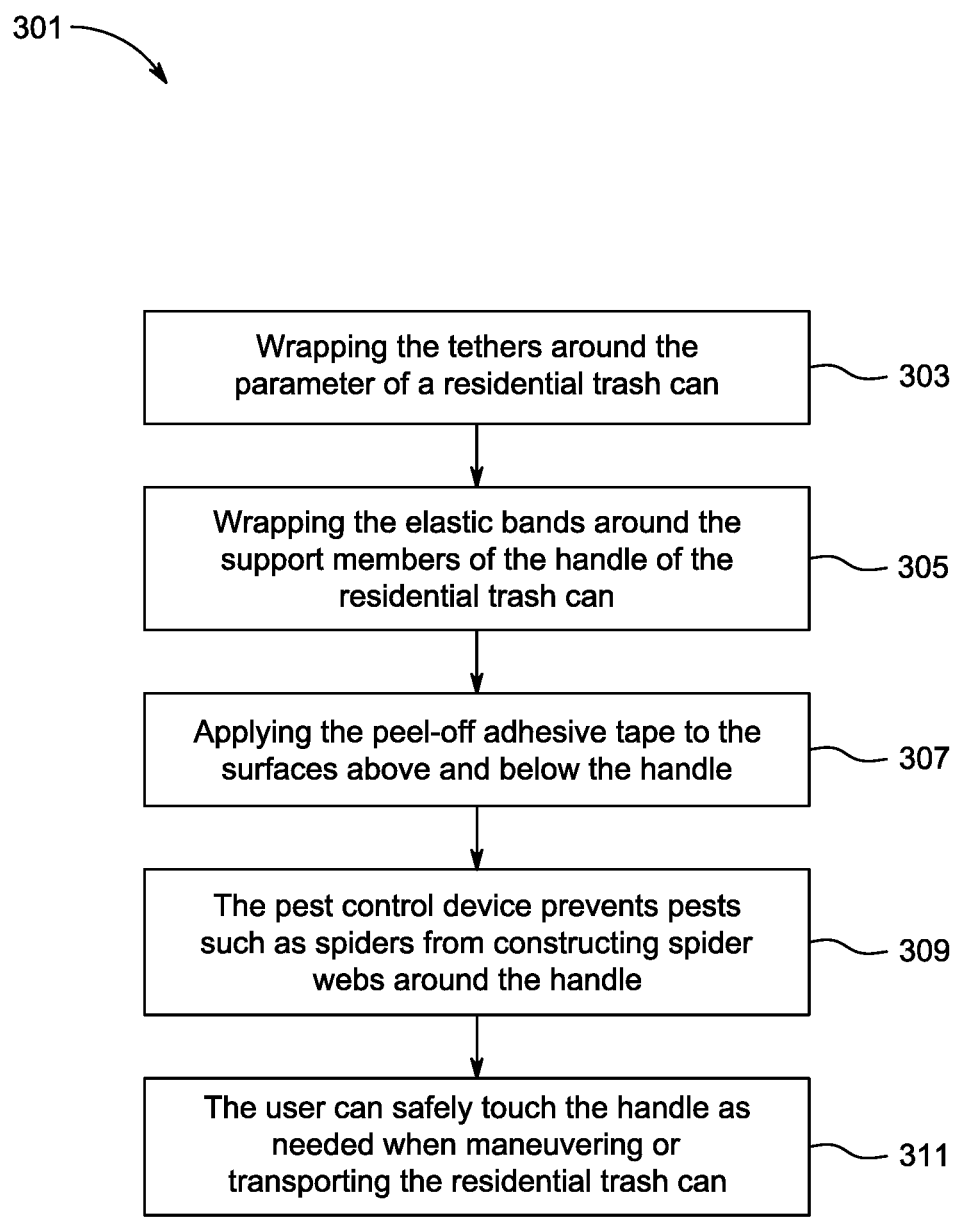
FIG. 3 is a flowchart of a method of use of the pest control devices of the present invention.

In FIG. 3, a flowchart 301 depicts a method of use of the pest control device 201. During use, the user can wrap the tethers around the parimeter of a residential trash can, as shown with box 303. The user can then wrap the elastic bands over the support members of the handle of a residential trash can, as shown with box 305. Next, the user can apply the peel-off the adhesive tape to the surfaces above and below the handle, as shown with box 307. The pest control device prevents pests such as spiders from constructing spider webs around the handle, as shown with box 309. The user can then safely touch the handle as needed when maneuvering or transporting the residential trash can, as shown with box 311.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of preventing pests and insects from accumulating around a handle of a residential trash can, the method comprising:
    providing a pest control device, the pest control device comprising:
        a generally rectangular shaped, flexible body, the body having:
            two longitudinally opposing ends; and
            two laterally opposing ends;
        a pair of elastic bands, each elastic band coupled to a respective end of the two longitudinally opposing ends;
        a pair of peel-off adhesive tapes, each adhesive tape coupled to a respective end of the two laterally opposing ends; and
        a pair of tethers, each tether connecting the two longitudinally opposing ends to each other;
    wherein the elastic bands wrap around a handle of a residential trash can;
    wherein the peel-off adhesive tapes are applied to surfaces of the residential trash can which are above and below the handle of the residential trash can, creating a semi-permanent seal around the handle;
    wherein the tethers wrap around a perimeter of the residential trash can;
    wrapping the elastic bands around the handle of the residential trash can; and
    applying the peel-off adhesive tape to the surfaces of the residential trash can which are above and below the handle of the residential trash can.

2. The method of claim 1, wherein the body of the pest control device is constructed of micromesh netting.

3. The method of claim 1, wherein the body of the pest control device is constructed of thin plastic film.

4. The method of claim 1, wherein the peel-off adhesive tapes of the pest control device are waterproof.

\* \* \* \* \*